United States Patent
Edwards et al.

(10) Patent No.: US 11,707,772 B2
(45) Date of Patent: Jul. 25, 2023

(54) HIGH FLOW DIFFERENTIAL CLEANING SYSTEM

(71) Applicant: United States of America as represented by the Administrator of NASA, Washington, DC (US)

(72) Inventors: Kevin Scott Edwards, Roanoke, VA (US); Mark Alan Mitchell, Decatur, AL (US); Eric Townsend Fox, Huntsville, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 77 days.

(21) Appl. No.: 16/909,572

(22) Filed: Jun. 23, 2020

(65) Prior Publication Data
US 2021/0213491 A1 Jul. 15, 2021

Related U.S. Application Data (60) Provisional application No. 62/927,326, filed on Oct. 29, 2019.

(51) Int. Cl.
 *B08B 9/032* (2006.01)
 *B60S 3/00* (2006.01)
(52) U.S. Cl.
 CPC .............. *B08B 9/0328* (2013.01); *B60S 3/00* (2013.01)
(58) Field of Classification Search
 None
 See application file for complete search history.

(56) References Cited

U.S. PATENT DOCUMENTS

| | | | | |
|---|---|---|---|---|
| 3,825,443 A | * | 7/1974 | Reilly | B08B 9/055 134/24 |
| 4,836,834 A | * | 6/1989 | Steele | B01D 46/71 95/279 |
| 5,184,427 A | * | 2/1993 | Armstrong | B24C 1/003 451/29 |
| 5,332,448 A | * | 7/1994 | Phillips | B08B 5/02 95/279 |

(Continued)

FOREIGN PATENT DOCUMENTS

| CN | 102089088 A | 6/2011 |
|---|---|---|
| CN | 102791390 A | 11/2012 |

(Continued)

OTHER PUBLICATIONS

English Translation WO2019063242, accessed on Nov. 2021. (Year: 2019).*

*Primary Examiner* — Eric W Golightly
*Assistant Examiner* — Arlyn I Rivera-Cordero
(74) *Attorney, Agent, or Firm* — Jerry L. Seemann; Trenton J. Roche (57) ABSTRACT

A high flow differential cleaning system uses a source of pressurized compressed dry gas to pressurize a holding tank. A component to be cleaned is securely loaded and oriented against a blast plate designed specifically for the desired pressure, flow, and volume. A fast-actuated valve system opens to direct high volumes of pressurized gas from a holding tank through and around the component(s) held within the cleaning chamber for the removal of remnant powder and foreign particles from interior cavities as well as exterior component surfaces.

15 Claims, 6 Drawing Sheets

(56) References Cited

U.S. PATENT DOCUMENTS

| | | | |
|---|---|---|---|
| 6,832,827 B2 | 12/2004 | Ray et al. | |
| 8,273,185 B2 * | 9/2012 | Milles | F01N 3/0233 134/22.18 |
| 9,605,628 B2 * | 3/2017 | Woodward | F02M 35/086 |
| 9,790,901 B1 * | 10/2017 | Dredge | B08B 9/00 |
| 2017/0354997 A1 | 12/2017 | Brown et al. | |
| 2018/0009007 A1 | 1/2018 | Craft et al. | |
| 2019/0176403 A1 | 6/2019 | Hutchinson | |

FOREIGN PATENT DOCUMENTS

| | | | | |
|---|---|---|---|---|
| DE | 102013007334 A1 | 10/2014 | | |
| JP | 2013121576 A | 6/2013 | | |
| WO | 2019063242 A1 | 4/2019 | | |
| WO | WO2019063242 | * | 4/2019 | B08B 5/02 |

* cited by examiner

HIGH FLOW DIFFERENTIAL CLEANING SYSTEM

CROSS-REFERENCE TO RELATED APPLICATIONS

This application claims the benefit of U.S. Application Ser. No. 62/927,326 filed Oct. 29, 2019, hereby incorporated by reference.

FEDERAL RESEARCH STATEMENT

Origin of Invention

Joint Government Employee and Large Business Inventions

"The invention described herein was made in the performance of work under a NASA contract and by an employee of the United States Government and is subject to the provisions of Section 20135(b) of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore."

BACKGROUND OF THE INVENTION

In some forms of additive manufacturing (AM), for example, using powder bed selective laser sintering, manufactured components/parts come out of the manufacturing process with a large amount of external and internal metal powder. This can be a problem as remnant metal powder from the laser sintering process may become trapped within the component. Unless the powder is removed, the component may not be usable, and post processing techniques like hot isostatic processing may only exacerbate the problem. However, the removal of trapped and loosely adhered remnant manufacturing powder within an additive manufactured component is not adequately accomplished by current cleaning techniques. Typical prior art methods are time consuming (tens of hours), pose an inhalation health risk, and are not sufficient to remove internally trapped powder.

Typically, powder removal is conducted by hand using vacuum and percussive force on the component to dislodge remnant production powder. Various forms of abrasive blasting (wet, bead, wheel, hydro, micro, automated, dry ice, bristle, and vacuum) are available, but the cleaning effectiveness diminishes significantly for components that have deep recessed cavities and chambers.

Other powder removal methods that use vacuum, compressed air, and CO2 snow work on direct line of sight surfaces, but are not effective for internal recessed cavities.

Some prior art cleaning methods utilize air nozzle connections to each discrete inlet of a component via small diameter tubing. However, this is not optimum as the air flow is reduced via the source tubing prior to the inlet, reducing the overall flow before it gets to the part.

Immersive cleaning of a component using solvents or cleaning solutions may not be acceptable in some instances, i.e., where fine powders are used, as powders tend to clump when they become wet, thereby greatly reducing the desired free flowing movement required for removal.

Another problem with prior art methods relates to safety. For example, when cleaning additive manufactured components, an operator must utilize personal protective equipment (PPE) during cleaning to avoid inhalation of metallic powders, which could range from 2 to 100 microns.

SUMMARY OF THE INVENTION

An object of the invention provides a high flow differential cleaning system comprising:
a holding tank configured to hold a supply of compressed gas;
a cleaning chamber;
a valve in communication with the holding tank and the cleaning chamber to selectively control the flow of gas through the cleaning chamber;
a component securing means coupled to the cleaning chamber to hold a part in the cleaning chamber;
an optional air expansion chamber, and;
a blast plate disposed upstream of the part to direct the flow of gas through the part.

An object of the invention provides a system, wherein the compressed gas is non-reactive.

An object of the invention provides the system, wherein the compressed gas is ambient air.

An object of the invention provides the system wherein the compressed gas is nitrogen.

An object of the invention provides the system, further comprising an air dryer.

An object of the invention provides the system, wherein the air dryer provides a pressure dew point of −40 degrees F.

An object of the invention provides a system with multiple holding tanks.

An object of the invention provides the system, further comprising multiple valves.

An object of the invention provides the system, wherein the valve is fast-actuated.

An object of the invention provides the system, wherein the optional air expansion chamber further comprises a deflector plate.

An object of the invention provides the system, wherein the optional air expansion chamber further comprises a powder collection plate.

An object of the invention provides the system, wherein the optional air expansion chamber further comprises a HEPA filter.

An object of the invention provides the system, further comprising plugs for inlets and outlets.

An object of the invention provides the system, further comprising a sampling port.

An object of the invention provides the system, further comprising windows.

An object of the invention provides the system, wherein the securing means is adjustable.

An object of the invention provides the system, further comprising a secondary media injection device.

An object the invention provides a system, further comprising a plurality of sample ports.

An object of the invention provides the system, wherein the flow of gas is approximately 4,000 CFM.

An object of the invention provides a method of cleaning a part comprising:
 a) placing a part in a system, wherein the system further comprises;
  i) a holding tank configured to hold a supply of compressed gas;
  ii) a cleaning chamber;

iii) a valve in communication with the holding tank and the cleaning chamber to selectively control the gas through the cleaning chamber; and iv) a blast plate disposed upstream of the part to direct the flow of gas through the part;

b) securing the part by securing means in the cleaning chamber; and c) subjecting the part to a gas flow of approximately 4,000 CFM while in the cleaning chamber, whereby containments are forced out of the part.

DETAILED DESCRIPTION

This disclosure relates to a system and process by which additive manufactured components (for example, using powder bed selective laser sintering) may be cleaned to remove remnant powder and foreign particles from interior cavities as well as exterior surfaces.

This disclosure relates to techniques using high flow differential (HFD) cleaning to remove remnant powder from parts manufactured using AM techniques. Unlike current prior art methods (described above) that are typically effective only at the component surface, the disclosed methods confine the part within a cleaning chamber against a pressurized plate whereby a large volume of pressurized gas is directed through or around the part. Based on the Bernoulli principle and Continuity equation, the high flow results in significant air velocities and a simultaneous decrease in pressure when the air flow passes through smaller component orifices, which in turn removes remnant powder from the part. In some examples, the component can be coupled to a rotatable platform. In some examples, the component can be vibrated during the cleaning process. All of the inlets of the part may be subject to the same high-volume pressurized flow or individually as required. The system may be designed to accommodate any size of component by adding or removing blast plate through-holes to the part being cleaned.

The disclosed novel cleaning method will support the AM industry as it moves forward to improve a myriad of components that could not be manufactured by any other means, as well as for the exploration of space where the ability to manufacture anything quickly and easily is paramount. The techniques disclosed in this disclosure result in a production level system that can support AM builds, thereby reducing cleaning times, process costs, and operator handling/exposure to micron metallic powders.

Typically, the cleaning process takes a mere second to totally evacuate the high pressurized air through the part being cleaned.

Figure 1:
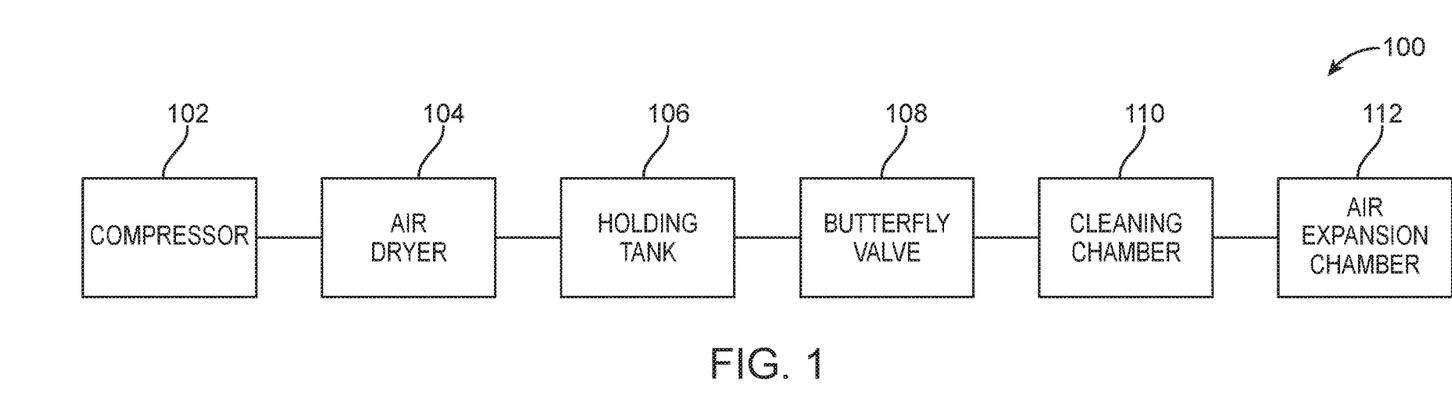
FIG. 1 is a block diagram depicting one example of a high flow differential cleaning system.

FIG. 1 is a high-level block diagram depicting one example of a high flow differential cleaning system. More detailed examples follow. FIG. 1 shows a high flow differential cleaning system 100. The system 100 includes a gas compressor 102, a dehumidifier/air dryer 104, a holding tank 106, a butterfly valve 108, a cleaning chamber 110, and a gas expansion chamber 112. The gas compressor 102 provides a supply of compressed gas to the holding tank 106. Any suitable gas compressor may be used. Any desired non-reactive gas may be used, such as but not limited to, ambient air, nitrogen, or other non-reactive gas. Preferably, the gas should have a low moisture content.

The pressurized holding tank 106 can be any suitable size, as needed. In one example, the holding tank 106 is a 500-gallon tank. In another example, two 500-gallon tanks are used, to provide higher gas flow rates.

The air dryer 104 removes moisture from the air since moisture could make sintering powder clump. If the source of air or gas has a low enough moisture content, the air dryer 104 may not be needed. An embodiment of the desiccant air dryer 104 can provide pressure dew points between −4 degrees F. to −100 degrees F.; preferably −10 degrees F. to −40 degrees F.; preferably −40 degrees F. to −100 degrees F. In one embodiment, the air dryer 104 more preferably provides a pressure dew point of −40 degrees F.

The butterfly valve 108 is a fast-actuated valve system that can quickly release the gas stored in the holding tank 106 into the cleaning chamber 110. Other types of valve systems could also be used, as desired. In examples where two holding tanks are used, a second valve system could be used in line with the second holding tank and the cleaning chamber.

The cleaning chamber 110 is designed to accommodate an additive manufactured component. Details of the cleaning chamber 110 are provided below. If desired, process pressure, velocity, and particle count sensors can be incorporated into the cleaning chamber for process development and control. Injection ports for secondary high-pressure media (i.e. CO2 or other particles) may also be part of this stage.

The air expansion chamber 112 allows air to expand and the flow to decrease after exiting the cleaning chamber 110. In some examples, the expansion chamber includes a deflector plate and a powder collection plate. Particles are allowed to settle via gravity to the capture plate, where they can be retrieved. The expansion chamber may include a HEPA (HEPA is an abbreviation for high-efficiency particulate air) filter that allows air to diffuse into the room for pressure relief. If external venting is available, the expansion chamber can be eliminated.

Figure 2:
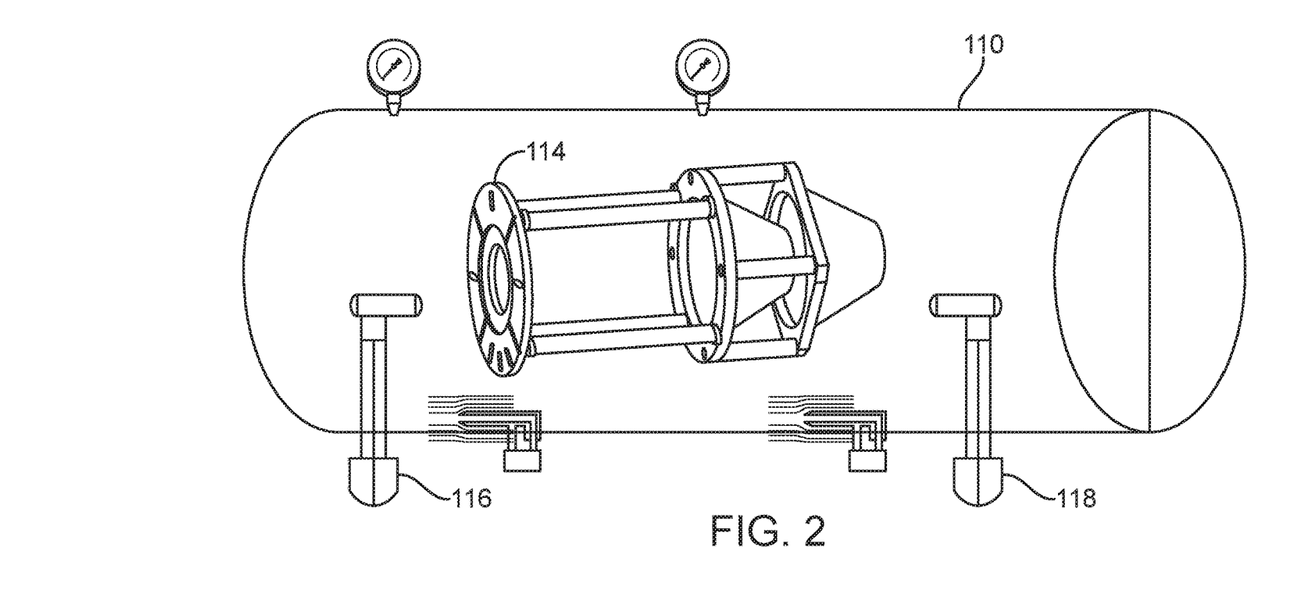
FIG. 2 is a diagram of one example of a cleaning chamber.

FIG. 2 is a diagram of one example of a cleaning chamber 110. A Component securing means, such as a component fixture 114 are used to securely hold the part to be cleaned within the cleaning chamber onto a fixture 114, and to direct high-pressure flow either through or around the part. FIG. 2 shows a fixture 114 that is configured to hold a part during the cleaning process.

Plugs for inlets/outlets of the component may also be added during repeated cycles to direct focused air flow through specific component channels. Openings in the component securing means, such as a blast plate 134 (described below), may be selectively plugged to further direct air flow where desired. Pressure forces on the part may be controlled or pulsed by controlling the tank pressure or flow paths for improved removal efficiency. Extensions may be also be added to the component outlets to eliminate pressure drops, which can result in the deposition of powder directly onto the exterior surface of the part.

In the example shown in FIG. 2, an optional secondary high-pressure upstream air/transport media injection device 116 is positioned upstream of the fixture 114 (and part) for the injection of media. An optional particle sampling port 118 may be used to collect removed particulate for size, quantity, and type analysis.

Figure 3:
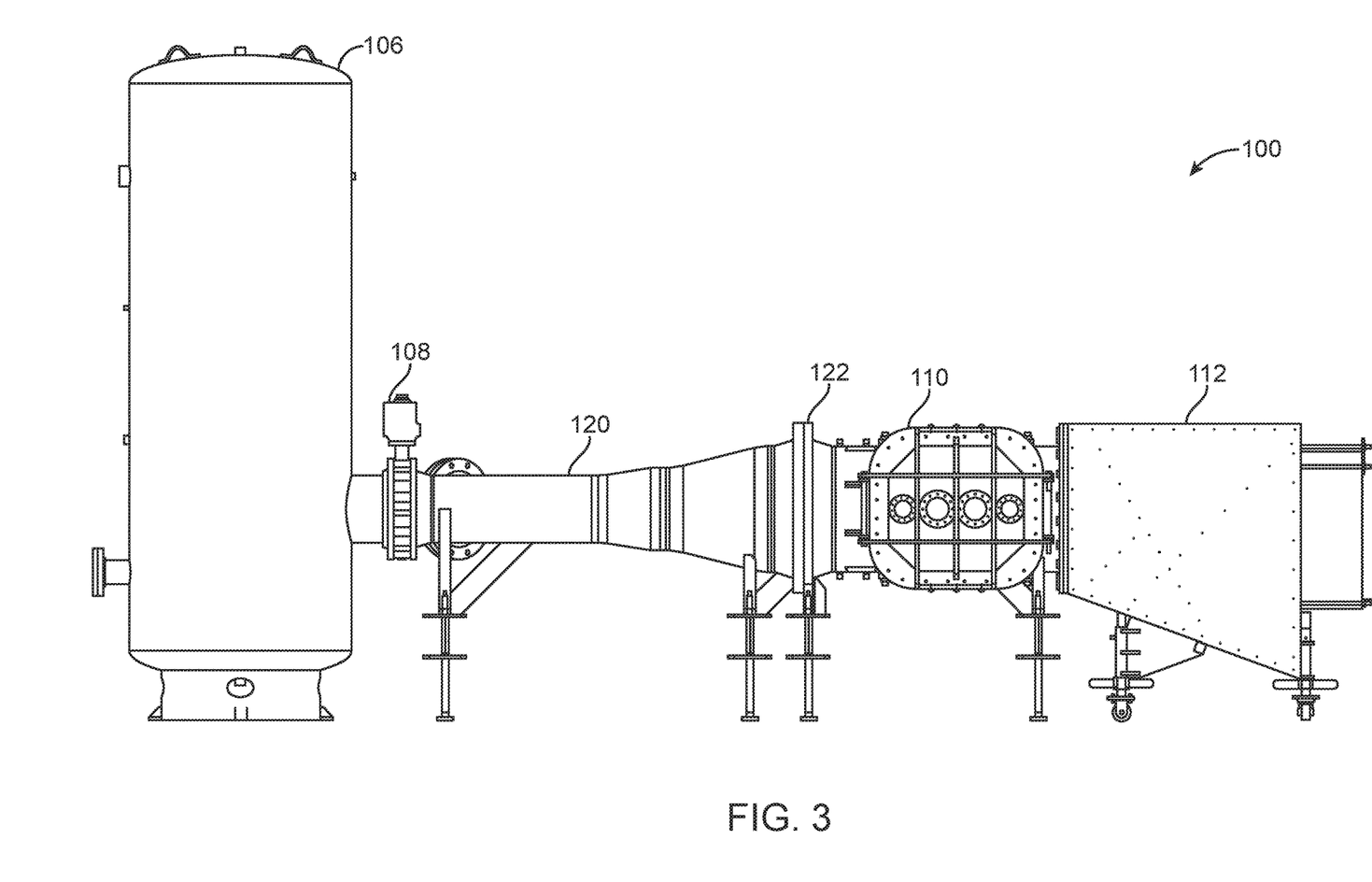
FIG. 3 is a diagram depicting an embodiment of a high flow differential cleaning system.

FIG. 3 is a diagram depicting an embodiment of a high flow differential cleaning system 100. For clarity, the high flow differential cleaning system 100 shown in FIG. 3 does not show a compressor or an air dryer. The system 100 includes a holding tank 106. In this example, the holding tank is a 500-gallon tank. A compressor (not shown), or other source of high-pressure air or gas pressurizes the holding tank 106. A butterfly valve 108 is connected between the tank 106 and piping 120. In this example, the butterfly valve 108 is 12 inches in diameter. The piping 120 connects the tank 106 to the cleaning chamber 110. In this example, the piping 120 is 12 inches in diameter at the inlet end, and expands to 24 inches at the outlet end. A 12 inch to 24-inch expansion collar 122 is also shown in FIG. 3.

The high flow differential cleaning system shown in FIG. 3 operates similarly to the system described above. Compressed air flow is injected into the cleaning chamber 110 via pressure rated large diameter piping 120, thus eliminating pressure drops and flow restrictions that would have occurred using smaller pressurized hoses. The increased area of the pressurized piping 120 results in significantly larger air flow velocities and overall removal force of remnant powder and contaminants. The system is capable of removing powder and contaminants from the exterior and interior of the component to be cleaned.

Figure 4:
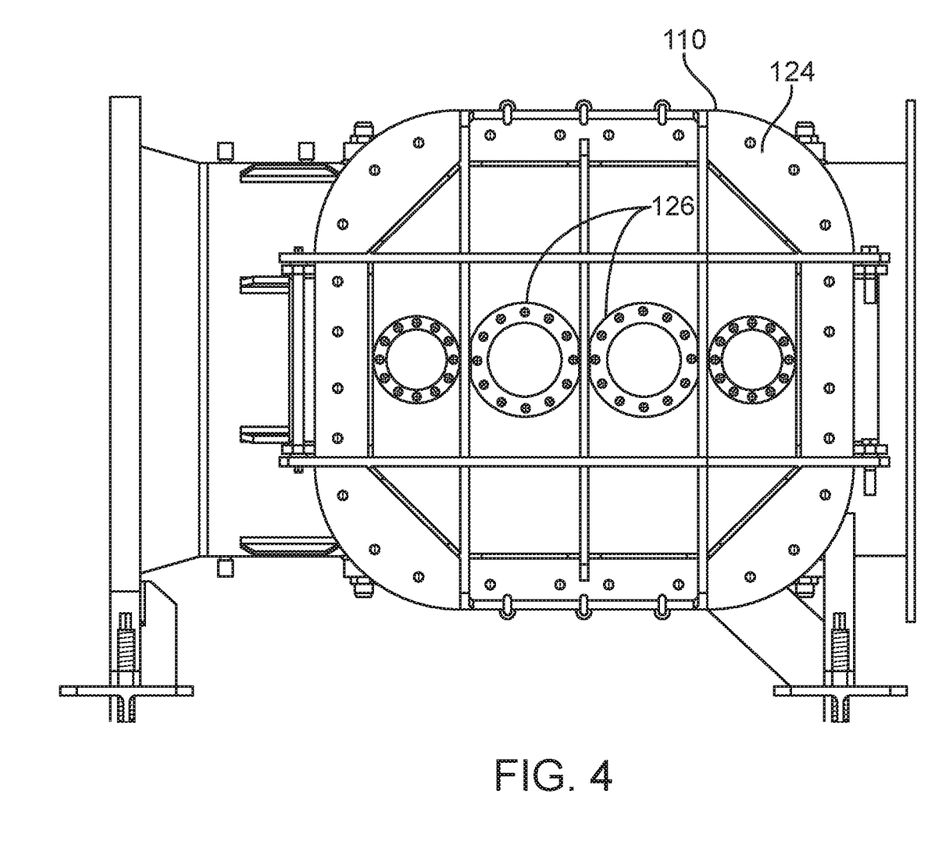
FIG. 4 is a side view of the cleaning chamber.
Figure 5:
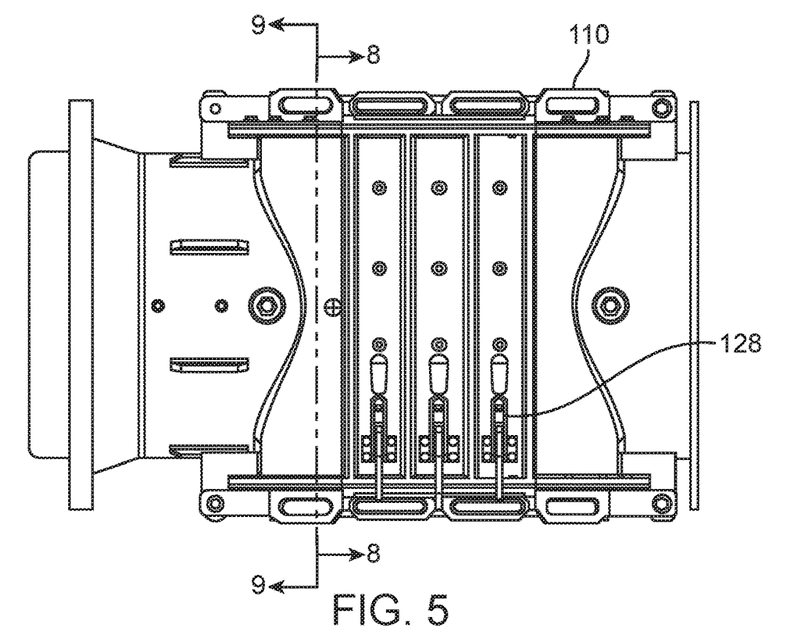
FIG. 5 is a top view of the cleaning chamber.
Figure 6:
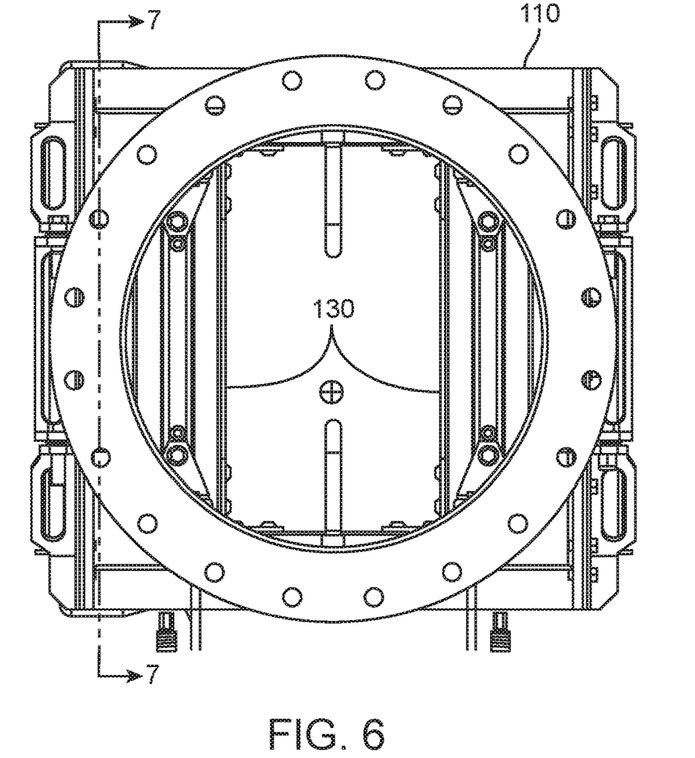
FIG. 6 is an end view of the cleaning chamber.
Figure 7:
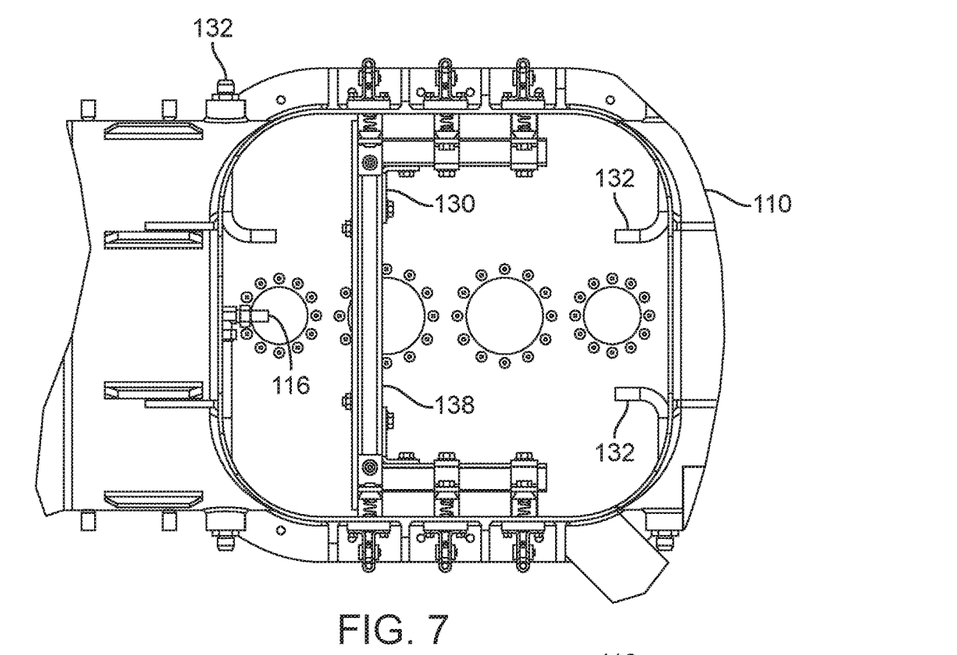
FIG. 7 is a sectional side view of the cleaning chamber taken along line 7-7 of FIG. 6.
Figure 8:
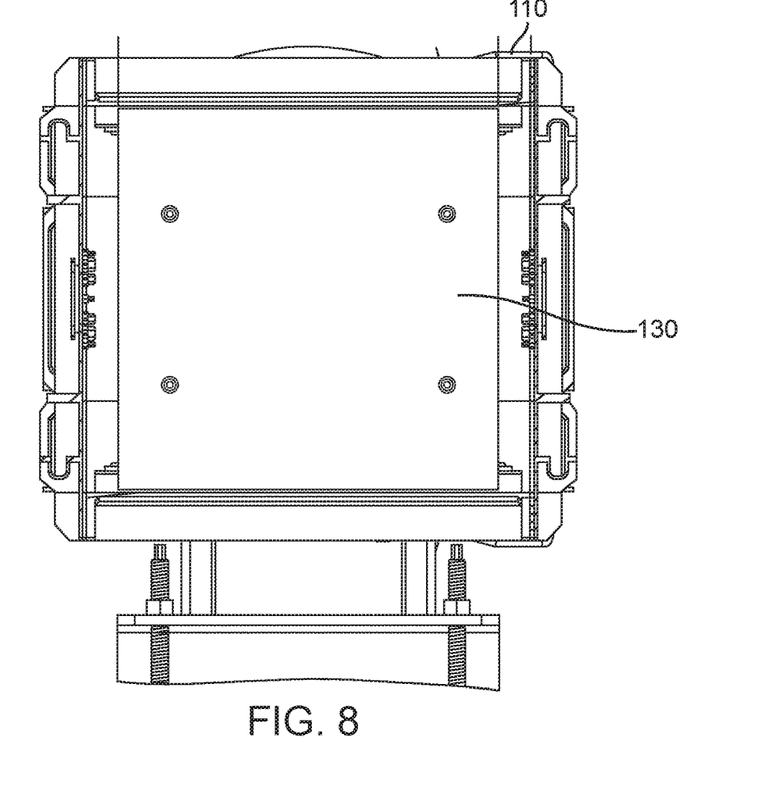
FIG. 8 is a sectional end view of the cleaning chamber taken along line 8-8 of FIG. 5.
Figure 9:
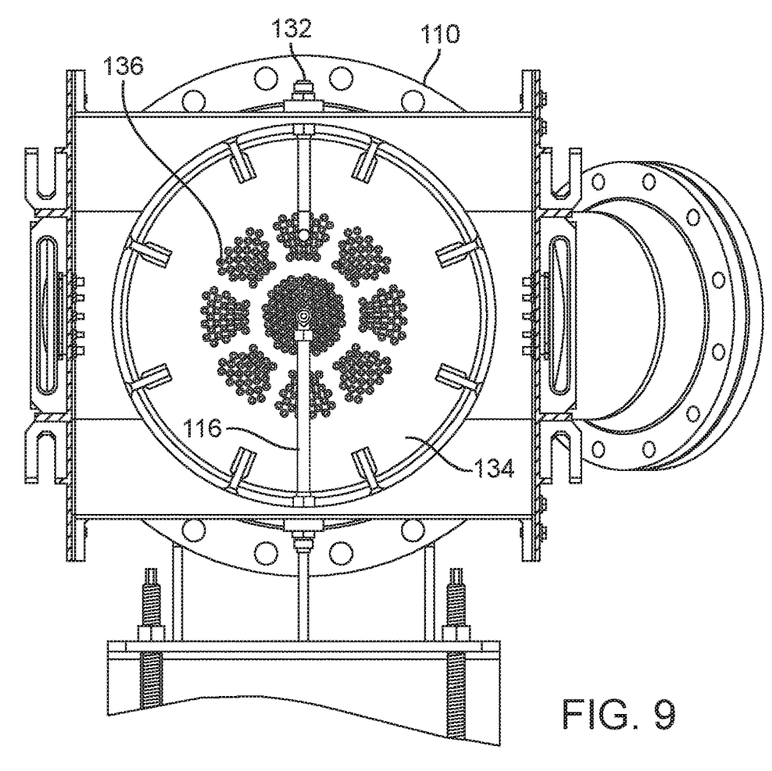
FIG. 9 is a sectional end view of the cleaning chamber taken along line 9-9 of FIG. 5.
Figure 10:
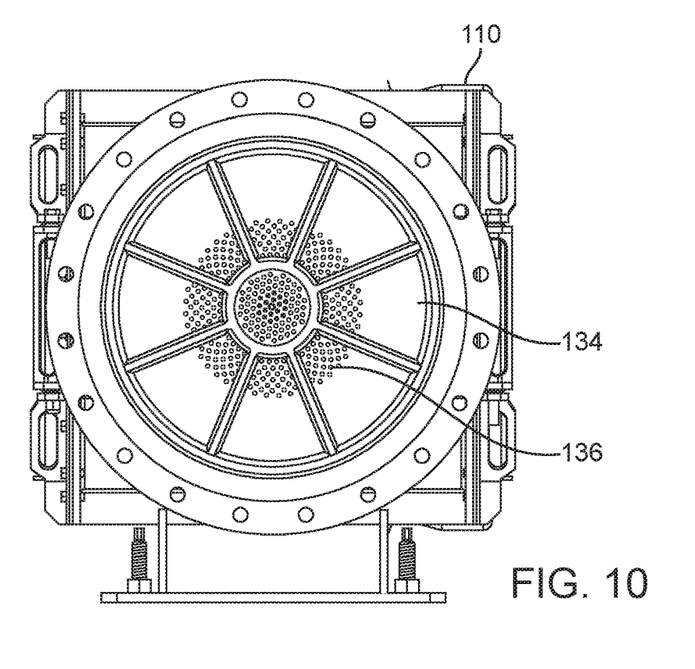
FIG. 10 is a view from the compressed gas pipe into the blast plate/cleaning chamber.

FIGS. 4-10 are diagrams showing details of the cleaning chamber 110 shown in FIG. 3. FIG. 4 is a side view of the cleaning chamber 110. In FIG. 4, the left side is the inlet. FIG. 5 is a top view of the cleaning chamber 110. In FIG. 5, the left side is the inlet. FIG. 6 is an outlet end view of the cleaning chamber 110. FIG. 7 is a sectional side view of the cleaning chamber 110 taken along line 7-7 of FIG. 6. FIG. 8 is a sectional end view of the cleaning chamber 110 taken along line 8-8 of FIG. 5 with an unmodified mounted component holding plate. FIG. 9 is a sectional end view of the cleaning chamber 110 taken along line 9-9 of FIG. 5. FIG. 10 is an inlet end view of the cleaning chamber 110.

As shown in FIG. 4, the side of cleaning chamber 110 has a door 124, which can be opened to access the interior of the cleaning chamber 110, for loading and unloading parts, configuring the blast plate 134 and the component securing means, for example the fixture plate 130, for the part being cleaned, etc. This door also provides a means to access the chamber to install sensors, probes, and to clean the chamber following use. The door 124 includes four windows 126 to enable users to view the interior of the cleaning chamber 110. FIG. 5 shows latching mechanisms 128 for securing the door 124 in the closed position. FIG. 6 shows the interior of the cleaning chamber 110, as seen from the outlet end.

The sectional view shown in FIG. 7 shows the interior of the cleaning chamber 110 from the side. A bracket is secured to the top and bottom of the cleaning chamber 110 for holding a build plate 138 or component mounted to a cleaning plate up against (and downstream of) the blast plate 134 (described below). The fixture plate 130, and any associated fixture for holding and manipulating the component to be cleaned, is designed for easy orientation adjustments. Component outlets may utilize extended exit nozzles to prevent particle low velocity release onto the component. As discussed below with respect to the blast plate 134, individual inlets/outlets may be individually plugged for focused cleaning. If desired, the component may be vibrated or rotated during pressurized flow to facilitate powder transfer.

FIG. 7 also shows an optional secondary media injection device 116. FIG. 7 shows a plurality of sample ports 132, which can used for pitot tubes, particle sensors, process sensors, pressure sensors, velocity sensors, etc.

FIGS. 8 and 9 are sectional views viewed from opposite sides of the item being cleaned, as shown by the sectional lines in FIG. 5. FIG. 8 shows a mounted build/fixture plate 130 (without exit through holes matched to the part being cleaned) in the interior of the cleaning chamber 110, upstream from the cleaning chamber exit.

FIG. 9 shows the interior of the cleaning chamber 110, looking upstream toward the blast plate 134. The blast plate 134 includes a plurality of blast plate holes/plugs 136 formed in the blast plate 134. The blast plate holes/plugs 136 can be selectively blocked with plugs, to control the flow of air through the part being cleaned. Various holes can be plugged based on factors such as the size of the part, orifices or passages through the part, desired flow rates, etc. FIG. 10 shows an end view of the cleaning chamber 110 in the pressurized pipe section, looking toward the inlet end. FIG. 10 also shows the blast plate 134 and blast plate holes/plugs 136. Air volume is directed to the component mounted on the build/component fixture plate 130 via placement of the component up to the blast plate 134, and via the configuration of the blast plate holes/plugs 136.

While the operation of a high flow differential cleaning system as disclosed has been discussed, the following is an example of the functional operation of a high flow differential cleaning system. Many other examples are possible within the scope of this disclosure.

First, or after the component is placed in the cleaning chamber, the compressor and desiccant air dryer are activated to fill the compressed air holding tank(s) with a compressed dry gas (air, nitrogen, etc.). As mentioned, other sources of a compressed gas may also be used. Next, the door to the cleaning chamber is opened and the component to be cleaned is securely loaded and orientated according to desired air flow. As mentioned above, plugs can be inserted into selected openings, as desired, for focused cleaning. Openings in the blast plate can be selectively plugged, based on the size of the component, desired air flows, etc. If used, the secondary high pressure/transport media injection nozzles are positioned upstream and/or downstream from the component. Next, the cleaning chamber door is closed and latched.

Once the cleaning chamber is closed and the component is ready, the compressed air valve is actuated to release a high volume of pressurized air into the component mounted in the cleaning chamber, thereby cleaning the component. Next, the component is re-oriented, inlet/outlet plugs are re-configured, and secondary nozzles are re-configured, as needed, for repeated processes. Finally, the component is removed and inspected for cleanliness.

Unlike typical prior art methods, the entire component is subjected to instantaneous high velocity and high-volume air flow. As an example, a typical prior art process uses an air flow of approximately 14 to 30 CFM, depending on the hose size supplying the compressed air, while the disclosed high flow differential cleaning system uses an air or gas flow of approximately 4,000 CFM, an increase over the prior art by a factor of 133 (as described herein, approximately means within + or −5% to 10%). Contaminants are forced out of the part as all passages are subjected to significant positive flow. Particles are unable to settle back into the part. If desired, outlets may be extended by inserting equal or smaller diameter tubing away from the component, thereby relocating pressure drops that would drop particles back at the location of increased area. Particle adhesion, especially at the boundary layer, is decreased as a result of the high flow. Mathematically, this result can be rationalized using the Equation of Continuity, which states that a decrease in area results in an increase in velocity. When applied to Bernoulli's Equation, an increase in gas velocity moving through a smaller diameter surface results in decreased pressure of that surface.

We claim:

1. A method of cleaning a part comprising:
   a) placing a part in a system, wherein the system further comprises;
      i) a holding tank configured to hold a supply of compressed gas;
      ii) a cleaning chamber;
      iii) a piping, wherein the piping is in direct communication with a valve, and wherein the piping connects the holding tank and the cleaning chamber;
      iv) wherein the valve is configured to selectively control a gas flow from the holding tank through into the cleaning chamber;
      v) a component fixture coupled to the cleaning chamber to hold a part in the cleaning chamber;
      vi) a blast plate disposed upstream of the part to direct the gas flow through the part; and
      wherein only positive gas flow is exerted thereon the cleaning chamber, the blast plate, or the part;
   b) securing the part by the component fixture in the cleaning chamber; and
   c) subjecting the part, the cleaning chamber, or the blast plate to the positive gas flow of approximately 4,000 CFM, whereby contaminants are forced out of the part to an air expansion chamber, wherein the air expansion chamber further comprises a deflector plate, a powder collection plate, or a HEPA filter.

2. A high flow differential cleaning system comprising:
a holding tank configured to hold a supply of compressed gas;
a cleaning chamber;
a piping, wherein the piping is in direct communication with a valve, and wherein the piping connects the holding tank and the cleaning chamber;
wherein the valve is configured to selectively control a gas flow from the holding tank through into the cleaning chamber;
a component fixture coupled to the cleaning chamber to hold a part in the cleaning chamber;
a blast plate disposed upstream of the part to direct the gas flow through the part;
wherein only positive gas flow of approximately 4,000 CFM is exerted thereon the cleaning chamber, the blast plate, or the part; and
an air expansion chamber, wherein the air expansion chamber further comprises a deflector plate, a powder collection plate, or a HEPA filter.

3. The system of claim 2, wherein the compressed gas is non-reactive.

4. The system of claim 2, wherein the compressed gas is ambient air.

5. The system of claim 2, wherein the compressed gas is nitrogen.

6. The system of claim 2, further comprising multiple holding tanks.

7. The system of claim 2, further comprising multiple valves.

8. The system of claim 2, further comprising plugs for inlets and outlets.

9. The system of claim 2, further comprising a sampling port.

10. The system of claim 2, further comprising windows.

11. The system of claim 2, wherein the component fixture is adjustable.

12. The system of claim 2, further comprising a secondary media injection device.

13. The system of claim 2, further comprising a plurality of sample ports.

14. The system of claim 2, further comprising an air dryer.

15. The system of claim 14, wherein the air dryer provides a pressure dew point of −40 degrees F.

* * * * *